United States Patent
Thommana et al.

(10) Patent No.: US 7,376,411 B2
(45) Date of Patent: May 20, 2008

(54) METHOD AND SYSTEM FOR ROUTING CALLS AS DETERMINED BY A CALL COST DATABASE OF A WIRELESS TRANSMIT/RECEIVE UNIT

(75) Inventors: John Thommana, Austin, TX (US); Ravikumar Pragada, Collegeville, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 162 days.

(21) Appl. No.: 10/881,791

(22) Filed: Jun. 30, 2004

(65) Prior Publication Data

US 2005/0286690 A1    Dec. 29, 2005

Related U.S. Application Data

(60) Provisional application No. 60/576,699, filed on Jun. 2, 2004.

(51) Int. Cl.
    *H04M 11/00* (2006.01)
(52) U.S. Cl. .............. 455/405; 455/552.1; 455/553.1; 455/554.1; 455/461; 455/406; 455/407; 455/408
(58) Field of Classification Search .......... 455/552.1, 455/553.1, 554.1, 461, 405–408, 428; 379/114, 379/221.01, 221.02, 114.01, 114.06, 220.01, 379/121.02
    See application file for complete search history.

(56) References Cited

U.S. PATENT DOCUMENTS

| | | | | |
|---|---|---|---|---|
| 5,260,988 A * | 11/1993 | Schellinger et al. | ...... | 455/552.1 |
| 5,519,769 A * | 5/1996 | Weinberger et al. | ... | 379/114.02 |
| 5,526,402 A * | 6/1996 | Dent et al. | ............... | 455/426.1 |
| 5,539,807 A * | 7/1996 | Ghisler et al. | .............. | 455/408 |
| 5,774,805 A * | 6/1998 | Zicker | ...................... | 455/426.1 |
| 5,794,141 A * | 8/1998 | Zicker | ......................... | 455/418 |
| 6,141,560 A * | 10/2000 | Gillig et al. | ............. | 455/553.1 |
| 6,208,719 B1 * | 3/2001 | Lo et al. | ................. | 379/114.03 |
| 6,263,057 B1 * | 7/2001 | Silverman | .............. | 379/114.02 |
| 6,330,311 B1 * | 12/2001 | Mijares et al. | ......... | 379/112.01 |
| 6,418,207 B1 * | 7/2002 | Kearns et al. | ......... | 379/114.06 |
| 6,577,717 B1 * | 6/2003 | Henon | .................... | 379/114.01 |
| 6,650,871 B1 * | 11/2003 | Cannon et al. | ............ | 455/41.2 |
| 6,671,359 B1 * | 12/2003 | Enzmann et al. | ....... | 379/115.01 |
| 6,708,028 B1 * | 3/2004 | Byrne | ....................... | 455/426.1 |
| 2002/0049073 A1 * | 4/2002 | Bell | .......................... | 455/552 |
| 2002/0101974 A1 * | 8/2002 | Zbib | ..................... | 379/221.02 |
| 2002/0147009 A1 * | 10/2002 | Kocheisen | .................. | 455/426 |
| 2002/0193107 A1 * | 12/2002 | Nascimento, Jr. | ........... | 455/426 |
| 2004/0132500 A1 * | 7/2004 | Rogalski et al. | ......... | 455/569.1 |

(Continued)

*Primary Examiner*—Rafael Perez-Gutierrez
*Assistant Examiner*—Kwasi Karikari
(74) *Attorney, Agent, or Firm*—Volpe and Koenig, P.C.

(57) ABSTRACT

A method and communication system for routing calls. The system includes at least one wireless transmit/receive unit (WTRU), at least one wireless base station, a land-line communication unit, and a land-line base unit. A call placed by the land-line communication unit is routed to the wireless base station via the WTRU when a database in the WTRU indicates that it is less costly than routing the call via the land-line base unit. Alternatively, a call placed by the WTRU is routed to the land-line base station when the database indicates that it is less costly than routing the call via the wireless base station. The database stores wireless phone data, land-line data and preferred usage data provided by a user of the WTRU.

21 Claims, 5 Drawing Sheets

U.S. PATENT DOCUMENTS

2005/0101347 A1* 5/2005 Prudent .................. 455/554.2
2005/0180560 A1* 8/2005 Kortum et al. ........ 379/413.03
2005/0197061 A1* 9/2005 Hundal ..................... 455/41.2
2006/0178137 A1* 8/2006 Loveland ................. 455/414.1

* cited by examiner

| DATABASE 110 | | |
|---|---|---|
| WIRELESS PHONE DATA 205 | LAND-LINE DATA 210 | PREFERRED USAGE DATA 215 |
| NUMBER OF FREE MONTHLY MINUTES 220 | CHARGE RATES FOR LOCAL CALLS 255 | PREFERRED USAGE FOR LOCAL CALLS 278 |
| NUMBER OF CHARGED MONTHLY MINUTES 225 | CHARGE RATES FOR LONG DISTANCE CALLS 260 | PREFERRED USAGE FOR LONG DISTANCE CALLS 280 |
| NUMBER OF CHARGED OVERAGE MINUTES 230 | CHARGE RATES FOR INTERNATIONAL CALLS 265 | PREFERRED USAGE FOR INTERNATIONAL CALLS 285 |
| TIME DURATION DATA WHEN FREE MINUTES ARE APPLICABLE 235 | TIME DURATION SPECIFIC DATA 270 | PREFERRED USAGE FOR TIME DURATION DATA 290 |
| LONG DISTANCE CHARGES AND CORRESPONDING TIME 240 DURATION DATA | | |
| INTERNATIONAL CHARGES AND CORRESPONDING TIME 245 DURATION DATA | | |
| CHARGE RATES FOR FACSIMILE AND LAN SERVICES WITH 250 TIME DURATION DATA | CHARGE RATES FOR FACSIMILE AND LAN SERVICES 275 | PREFERRED USAGE FOR FACSIMILE AND LAN SERVICES 295 |

*FIG. 3*

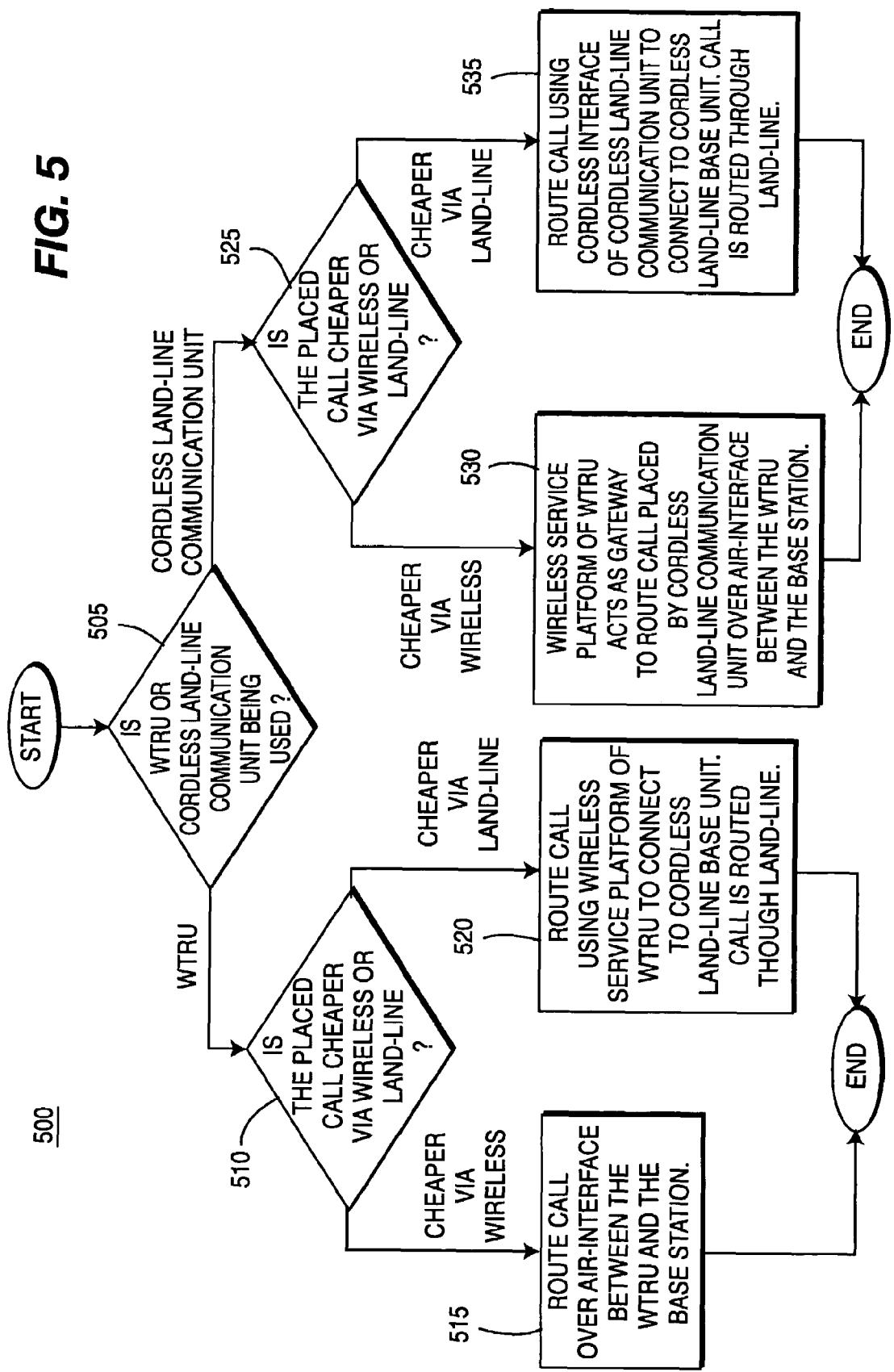

METHOD AND SYSTEM FOR ROUTING CALLS AS DETERMINED BY A CALL COST DATABASE OF A WIRELESS TRANSMIT/RECEIVE UNIT

CROSS REFERENCE TO RELATED APPLICATION(S)

This application claims priority from U.S. provisional application No. 60/576,699, filed Jun. 2, 2004, which is incorporated by reference as if fully set forth.

FIELD OF INVENTION

The present invention relates to the field of wireless communications. More specifically, the present invention relates to routing calls based on parameters programmed in a database by a user of a mobile station.

BACKGROUND

Most cell phone plans available today are categorized into three usage categories: (1) free minutes; (2) charged minutes; and (3) overage minutes. Currently, cell phones do not internally keep track of minutes used for each of the above-mentioned categories, nor do they allow a user to program desired usage schemes based on such categories.

Most cell phone users use a land-line connection at home in conjunction with their cell phones. A system and method for intelligently routing calls via a land-line or wireless service provider based on various station call and service usage data is desired to provide the best possible service and rates to the user.

SUMMARY

The present invention is a method and communication system for routing calls. The system includes at least one wireless transmit/receive unit (WTRU), at least one wireless base station in communication with the WTRU for providing wireless services to the WTRU, a land-line communication unit, and a land-line base unit in communication with the land-line communication unit. The WTRU includes a database. A call placed by the land-line communication unit is routed to the wireless base station via the WTRU when the database indicates that it is less costly than routing the call via the land-line base unit. Alternatively, a call placed by the WTRU is routed to the land-line base station when the database indicates that it is less costly than routing the call via the wireless base station.

The database may store wireless phone data, land-line data and preferred usage data provided by a user. The wireless phone data indicates a number of free minutes allocated for a predetermined period of time, a number of charged minutes for the predetermined period of time, and a number of charged overage minutes. The land-line data indicates charge rates for local, long distance and international calls. The preferred usage data indicates the preferred usage for local, long distance and international calls.

The wireless phone data indicates time duration data associated with the allocated free minutes. The database stores time duration data associated with long distance and international charges. The database stores charge rates for facsimile and local area network (LAN) services, and indicates the preferred usage of the facsimile and LAN services.

The WTRU may further include a wireless service platform equipped with a Bluetooth® interface. The land-line base unit may include a service platform equipped with a Bluetooth® interface. The land-line communication unit includes a Bluetooth® interface for communicating with a selected one of the land-line base unit and the WTRU.

BRIEF DESCRIPTION OF THE DRAWINGS

A more detailed understanding of the invention may be had from the following description, given by way of example and to be understood in conjunction with the accompanying drawings wherein:

FIG. 3 shows a database configured within the WTRU of FIG. 1 in accordance with the present invention;

FIG. 5 is a flowchart of a process including method steps implemented in the WTRU of the wireless communication system of FIG. 1 in accordance with another embodiment of the present invention.

DETAILED DESCRIPTION OF THE PREFERRED EMBODIMENT(S)

Figure 1:
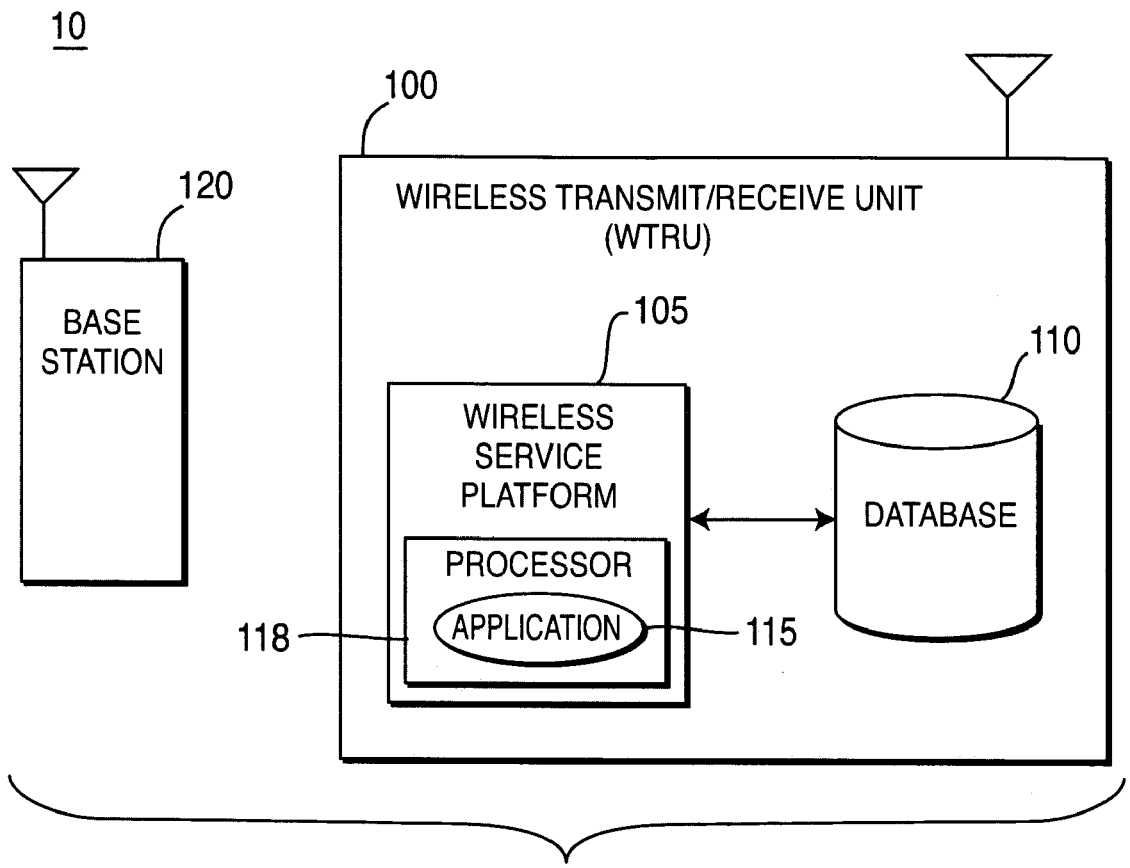
FIG. 1 shows a wireless communication system including a base station and a WTRU configured in accordance with the present invention.

The preferred embodiments will be described with reference to the drawing figures where like numerals represent like elements throughout.

The present invention is a communication system for intelligently routing calls based on user programmed criteria stored in a database. By maintaining a database for various usage scenarios and providing the user with smart usage schemes, a differentiating factor for cell phone users is provided. A smart routing system is provided which can determine the optimal routing scenario based on the time of the day, call charge rates for land-line and cell phones, local/long-distance/international call etc., to obtain the best possible service rates for the user.

Smart routing scenarios based on the time of the day, call charge rates, and the type of call, such as local, long distance or international calls, is factored into consideration to get the best possible service and rates for the user. To achieve this, a land-line connection at a user's home/office must be available for use in conjunction with the user's wireless transmit/receive unit (WTRU).

Hereafter, a WTRU includes but is not limited to a user equipment (UE), mobile station, fixed or mobile subscriber unit, pager, or any other type of device capable of operating in a wireless environment.

Furthermore, a base station includes, but is not limited to, a Node B, site controller, access point, local area network (LAN), wide area network (WAN), or other interfacing device in a wireless environment.

FIG. 1 shows a wireless communication system 10 including a WTRU 100 and a base station 120 which operate in accordance with the present invention. The WTRU 100 includes a wireless service platform 105 which may, for example, be equipped with a Bluetooth® interface. Bluetooth® provides various services including access to a cordless telephony gateway or terminal, a LAN gateway, a facsimile server, or a dial-up network. The WTRU 100 further includes a database 110 in communication with the platform 105.

The database 110 of WTRU 100 allows a user to enter data and criteria therein used to determine how to route and process calls placed via the WTRU 100. An intelligent decision making application 115 runs on a processor 118 located within the wireless service platform 105. The application 115 decides when to offer various services to the user of the WTRU 100, based on various parameters such as calling rates, time of the day, data rate, or the like.

Figure 2:
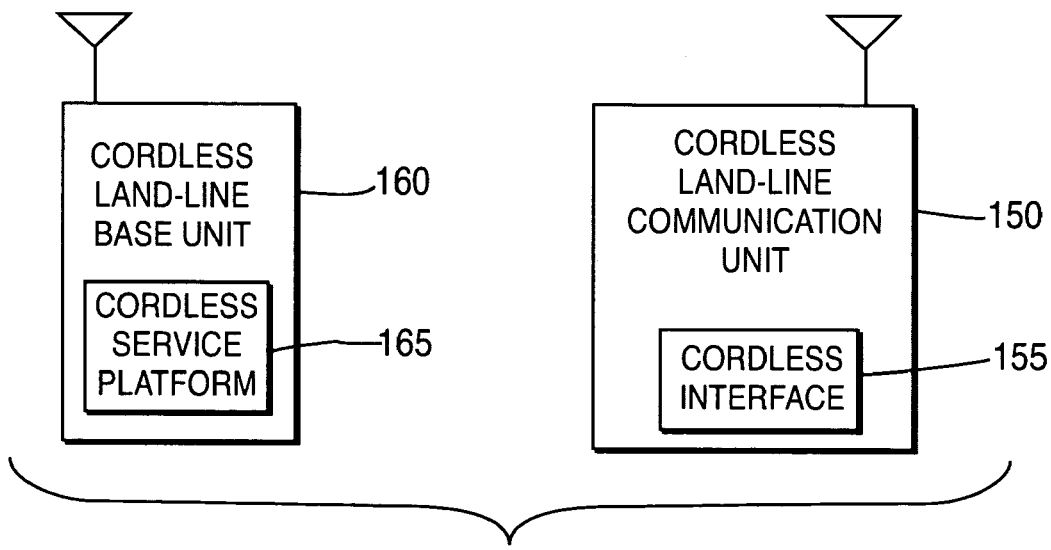
FIG. 2 shows a land-line system including a cordless communication unit and a base unit for use in conjunction with the system of FIG. 1.

FIG. 2 shows a land-line communication system 20 including a cordless land-line communication unit 150 and a cordless land-line base unit 160. The cordless land-line base unit 160 includes a cordless service platform 165 which may, for example, be equipped with a Bluetooth interface similar to the one described above. The cordless land-line communication unit 150 also includes a cordless interface 155 that is configured to selectively interact with the cordless service platform 165 of cordless land-line base unit 160 and the wireless service platform 105 of WTRU 100. The cordless interface 155 may also be equipped with a Bluetooth® interface. The present invention allows the wireless communication system 10 to interact with the land-line communication system 20, and vice versa.

FIG. 3 show an exemplary configuration of the database 110 within the WTRU 100. The database 110 stores various parameters associated with wireless phone data 205, land-line data 210 and preferred usage data 215. Such parameters may be entered by a user of the WTRU 100, or may be automatically maintained and updated by periodically downloading data from a service provider node to the WTRU 100.

For the wireless phone data 205, the database 100 may store the number of free monthly minutes 220 allocated to a user of the WTRU 100, the number of charged monthly minutes 225 allocated to the user, and a number of charged overage monthly minutes 230 allocated to the user.

For the wireless phone data 205, the database 110 further stores time duration data 235 when free minutes are applicable. For example, the data may indicate that free minutes are applicable from 9:00 PM-7:00 AM on Monday, Tuesday, Wednesday and Thursday, and from 9:00 PM on Friday through 7:00 AM on Monday.

For the wireless phone data 205, the database 110 further stores long distance charges and corresponding time duration data 240, international charges and corresponding time duration data 245, and charge rates for facsimile and local access network (LAN) services with time duration data 250.

For the land-line data 210, the database 110 stores charge rates for local calls 255, charge rates for long distance calls 260, charge rates for international calls 265, time duration specific data 270 and charge rates for facsimile and LAN services 275.

For the preferred usage data 215, the database 110 stores preferred usage for local calls 278, preferred usage for long distance calls 280, preferred usage for international calls 285, preferred usage for time duration data 290 (e.g., use only the wireless phone on Monday from 9:00 AM-10:00 AM), and preferred usage for facsimile and LAN services 295.

In one embodiment, the platform 105 may be used as a cordless telephony terminal whereby calls are routed through a Bluetooth® interface under the following scenarios. One scenario is if the user of a WTRU 100 places a local call and land-line service provided by the platform 105 provides free local calls. Another scenario is if the user of a WTRU 100 places a long distance or international call and it is determined that land-line rates are lower than wireless rates. In yet another scenario, calls are routed through a Bluetooth® interface if the database 110 determines that all of the user's free and regular call minutes are used up, and overage charges are higher than land-line charges.

In another embodiment, the platform 105 may be used as a cordless telephony gateway. During free call periods, for example, weekends and 9:00 PM through 7:00 AM on weekdays, the platform configures a Bluetooth® interface as a gateway, and advertises to those WTRUs that are Bluetooth® terminals that telephony services are available. Thus, the user of a Bluetooth® terminal will be offered to choose one of two possible gateways that offer telephony services.

In another embodiment, the platform 105 may be used as a facsimile server. Whenever there are free minutes available, or when the cell phone rates are lower than the land-line rates, the platform 105 will advertise itself as a facsimile server. G3 fax services of Global System for Mobile Communication—Universal Mobile Telecommunications System (GSM-UMTS) may be used for relaying faxes to their destination via a Bluetooth® interface.

Before initiating a packet switched connection over the GSM UMTS network, the platform 105 searches for a Bluetooth® based LAN gateway. If such a gateway is available, the packet switched connection is established over the Bluetooth® interface instead of the Third Generation (3G)/GSM network. This may save the user minutes and may provide better service. The platform 105 may also provide a LAN gateway for users when their residential cable/digital subscriber line (DSL) network is not available.

Figure 4A:
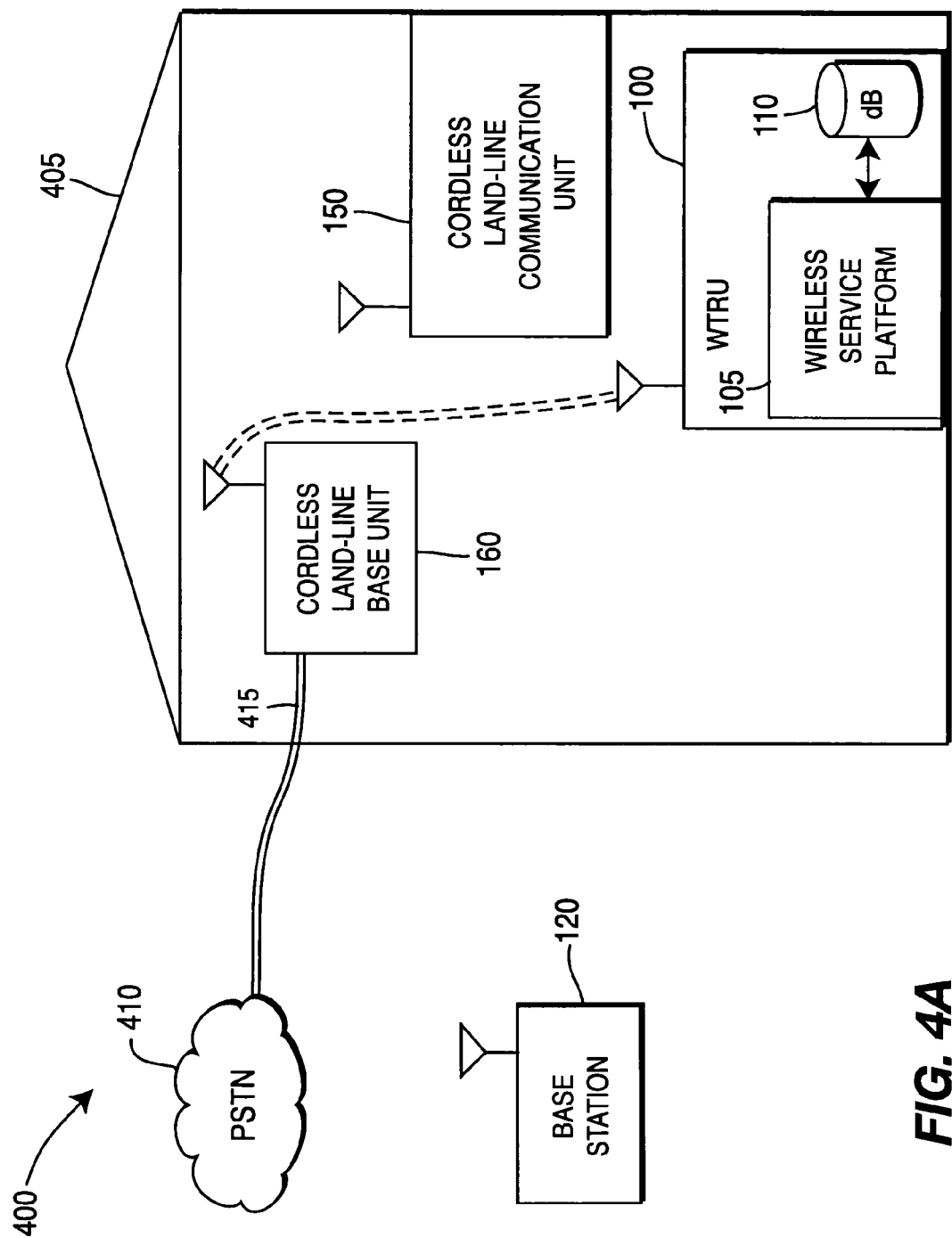
FIG. 4A shows the system of FIG. 1 operating in conjunction with the land-line system of FIG. 2 in accordance with a first exemplary embodiment of the present invention.

FIG. 4A shows an integrated communication system 400 including the components of wireless communication system 10 and the land-line communication system 20 in accordance with a first exemplary embodiment of the present invention. The cordless land-line base unit 160, cordless land-line communication unit 150 and WTRU 100 all reside within a home/office environment 405. The cordless land-line base unit 160 communicates with a land-line network, such as a public switched telephone network (PSTN) 410 via a land-line connection 415. Under normal circumstances, calls placed by the WTRU 100 are routed to a wireless service via the base station 120.

In one embodiment, a local call, for example, placed by the WTRU 100 during the day is routed via a land-line service after the application 115 within WTRU 100 queries the database 110 and determines that calls are free if routed via a land-line service. The call is routed from the WTRU 100 through the cordless land-line base unit 160 to the PSTN 410 via the land-line connection 415, and not through the base station 120. In another example, an international call is placed and the application 115 within WTRU 100 queries the database 110 and determines that routing the call via a land-line service would be cheaper than using a wireless service. Again, the call is routed from the WTRU 100 through the cordless land-line base unit 160 to the PSTN 410 via the land-line connection 415, and not through the base station 120.

Figure 4B:
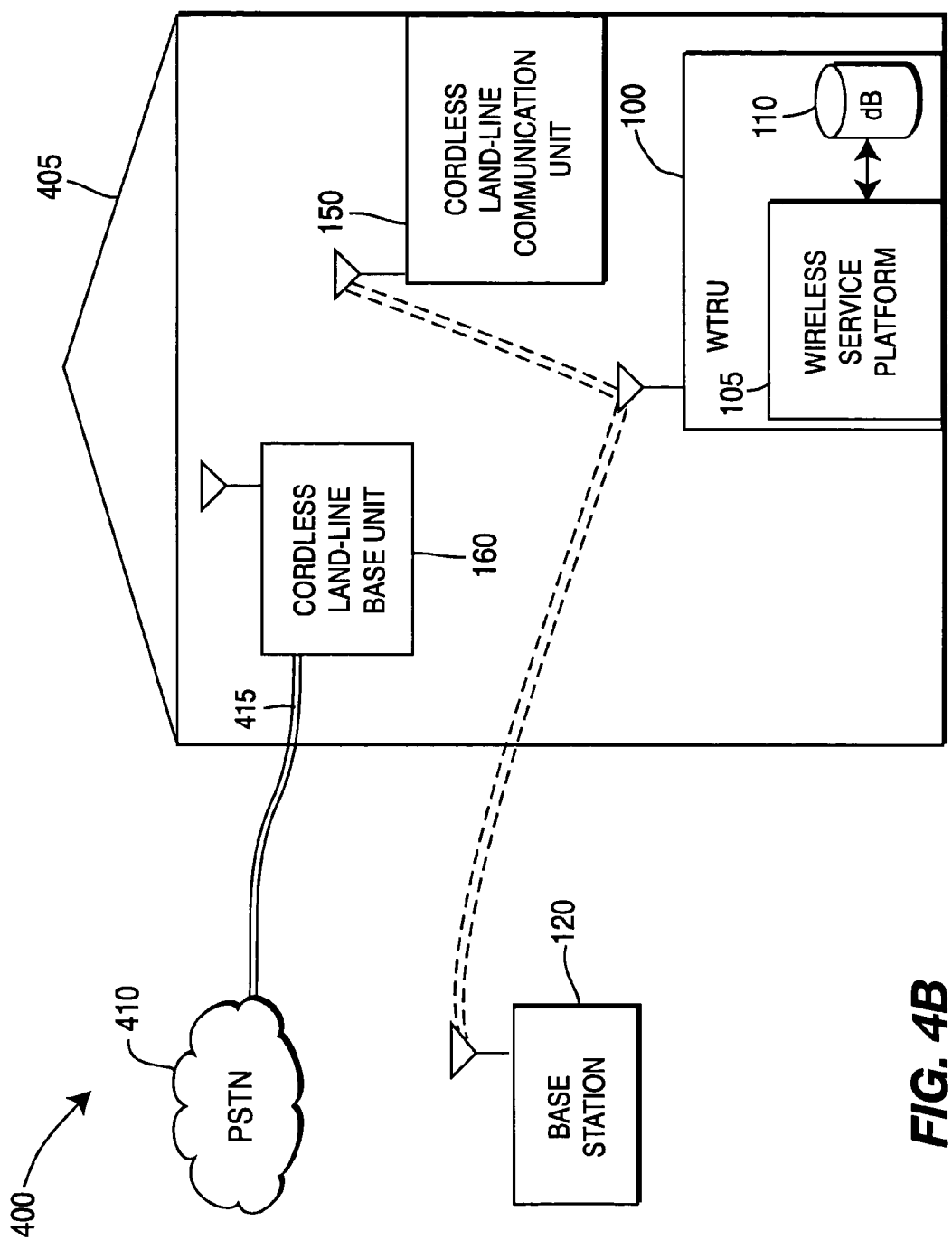
FIG. 4B shows the system of FIG. 1 operating in conjunction with the land-line system of FIG. 2 in accordance with a second exemplary embodiment of the present invention.

FIG. 4B illustrates a second exemplary embodiment of the present invention whereby, for example, a long distance call placed by the cordless land-line communication unit during off-peak hours is routed via a wireless service when calls are free if routed via the wireless service and expensive if routed via the land-line service. The call is routed from the cordless land-line communication unit 150 to the wireless service platform 105 of the WTRU 100, which in turn forwards the call to the base station 120 of the wireless service provider.

FIG. 5 is a flowchart of a process 500 including method steps implemented by integrated communication system 400 in accordance with the present invention. In step 505, a determination is made as to whether the WTRU 100 is being used to place a call or the cordless land-line communication unit 150.

If the WTRU 100 is being used to place a call, a determination is then made as to whether the placed call is cheaper via a wireless service provider or a land-line service provider (step 510). If the call is cheaper via the wireless service provider, the call is routed via the air-interface between the WTRU 100 and the wireless base station 120 associated with the wireless service provider (step 515). If the call is cheaper via the land-line service provider, the call is routed to the PSTN 410 via the cordless land-line base unit 160 and land-line connection 415 (step 520).

If the cordless land-line communication unit 150 is being used to place a call, a determination is made as to whether the placed call is cheaper via a wireless service provider or a land-line service provider (step 525). Assuming that the cordless land-line communication unit 150 has a Bluetooth® interface 155 therein, a selection between two possible routing paths is made between a Bluetooth® gateway in the cordless land-line base unit 160 and the WTRU 100. If the call is less costly via the wireless service provider, the call is routed via the wireless service platform 105 of the WTRU 100 and the base station 120 associated with the wireless service provider (step 530). If the call is less costly via the land-line service provider, the call is routed from the cordless land-line communication unit 150 to the cordless land-line base unit 160, which in turn routes the call to the PSTN 410 via the land-line connection 415 (step 535).

While the present invention has been described in terms of the preferred embodiment, other variations which are within the scope of the invention as outlined in the claims below will be apparent to those skilled in the art.

What is claimed is:

1. A communication system for routing calls based on the cost of the calls, the system comprising:
   (a) a wireless transmit/receive unit (WTRU) including a wireless service platform and a call cost database;
   (b) a wireless base station;
   (c) a first cordless land-line unit including a cordless service platform; and
   (d) a second cordless land-line unit including a cordless interface that is configured to selectively interact with the cordless service platform of the first cordless land-line unit and the wireless service platform of the WTRU, wherein a call placed by the second cordless land-line unit is routed to a wireless service platform of the WTRU, which in turn forwards the call to the wireless base station without using the first cordless land-line unit, instead of routing the call via the first cordless land-line unit, when the call cost database in the WTRU indicates that it is less costly to route the call via the WTRU and the wireless base station than routing the call via the first cordless land-line unit.

2. The system of claim 1 wherein the WTRU further comprises a wireless service platform having a processor on which an intelligent decision making application runs, the application deciding when to offer various services to a user of the WTRU based on various parameters stored in the call cost database, the wireless service platform being configured to communicate with the call cost database.

3. The system of claim 2 wherein the call cost database stores wireless phone data, land-line data and preferred usage data provided by the user of the WTRU.

4. The system of claim 3 wherein the wireless phone data indicates a number of free minutes allocated for a predetermined period of time, a number of charged minutes for the predetermined period of time, and a number of charged overage minutes.

5. The system of claim 3 wherein the land-line data indicates charge rates for local, long distance and international calls.

6. The system of claim 3 wherein the preferred usage data indicates the preferred usage for local, long distance and international calls.

7. The system of claim 3 wherein the call cost database stores time duration data associated with long distance and international charges.

8. The system of claim 3 wherein the call cost database stores charge rates for facsimile and local area network (LAN) services, and indicates the preferred usage of the facsimile and LAN services.

9. The system of claim 4 wherein the wireless phone data indicates time duration data associated with the allocated free minutes.

10. A communication system for routing calls based on the cost of the calls, the system comprising:
    (a) a wireless transmit/receive unit (WTRU) including a wireless service platform and a call cost database;
    (b) a wireless base station;
    (c) a first cordless land-line unit including a cordless service platform; and
    (d) a second cordless land-line unit including a cordless interface that is configured to selectively interact with the cordless service platform of the first cordless land-line unit and the wireless service platform of the WTRU, wherein a call placed by the WTRU is routed via the first cordless land-line unit without using the second cordless land-line unit, instead of routing the call via the wireless base station, when the call cost database in the WTRU indicates that it is less costly to route the call via the first cordless land-line unit than routing the call via the wireless base station.

11. The system of claim 10 wherein the WTRU further comprises a wireless service platform having a processor on which an intelligent decision making application runs, the application deciding when to offer various services to a user of the WTRU based on various parameters stored in the call cost database, the wireless service platform being configured to communicate with the call cost database.

12. The system of claim 11 wherein the call cost database stores wireless phone data, land-line data and preferred usage data provided by the user of the WTRU.

13. The system of claim 12 wherein the wireless phone data indicates a number of free minutes allocated for a predetermined period of time, a number of charged minutes for the predetermined period of time, and a number of charged overage minutes.

14. The system of claim 12 wherein the land-line data indicates charge rates for local, long distance and international calls.

15. The system of claim 12 wherein the preferred usage data indicates the preferred usage for local, long distance and international calls.

16. The system of claim 12 wherein the call cost database stores time duration data associated with long distance and international charges.

17. The system of claim 12 wherein the call cost database stores charge rates for facsimile and local area network (LAN) services, and indicates the preferred usage of the facsimile and LAN services.

18. The system of claim 13 wherein the wireless phone data indicates time duration data associated with the allocated free minutes.

19. A communication system for routing calls based on the cost of the calls, the system comprising:
 (a) a wireless transmit/receive unit (WTRU) including a call cost database and a wireless service platform having a processor on which an intelligent decision making application runs, the application deciding when to offer various services to a user of the WTRU based on various parameters stored in the call cost database, the wireless service platform being configured to communicate with the call cost database;
 (b) a first cordless land-line unit including a cordless service platform; and
 (c) a second cordless land-line unit including a cordless interface that is configured to selectively interact with the cordless service platform of the first cordless land-line unit and the wireless service platform of the WTRU.

20. The system of claim 19 further comprising:
 (d) a wireless base station, wherein a call placed by the second cordless land-line unit is routed to a wireless service platform of the WTRU, which in turn forwards the call to the wireless base station without using the first cordless land-line unit, instead of routing the call via the first cordless land-line unit, when the call cost database in the WTRU indicates that it is less costly to route the call via the WTRU and the wireless base station than routing the call via the first cordless land-line unit.

21. The system of claim 19 further comprising:
 (d) a wireless base station, wherein a call placed by the WTRU is routed via the first cordless land-line unit without using the second cordless land-line unit, instead of routing the call via the wireless base station, when the call cost database in the WTRU indicates that it is less costly to route the call via the first cordless land-line unit than routing the call via the wireless base station.

* * * * *